United States Patent [19]

Suer

[11] 4,034,415

[45] July 5, 1977

[54] THERMAL PROTECTION FOR D.C. MOTORS

[75] Inventor: James David Suer, Cincinnati, Ohio

[73] Assignee: Cincinnati Milacron, Inc., Cincinnati, Ohio

[22] Filed: Mar. 15, 1976

[21] Appl. No.: 666,923

[52] U.S. Cl. .................................. 361/24; 361/26
[51] Int. Cl.² ...................................... H02H 7/085
[58] Field of Search ............ 317/13 B, 13 C, 13 A, 317/13 R, 41, 40 R; 318/221 H, 471, 473, 474; 338/22 R, 23; 219/491, 501

[56] References Cited

UNITED STATES PATENTS

| | | | |
|---|---|---|---|
| 2,930,959 | 3/1960 | Slocum | 317/13 B X |
| 2,940,395 | 6/1960 | Hill | 318/471 X |
| 3,482,146 | 12/1969 | McMorrow et al. | 317/13 C |
| 3,555,356 | 1/1971 | Kaiser | 317/13 C |
| 3,564,293 | 2/1971 | Mungenast | 317/41 X |

FOREIGN PATENTS OR APPLICATIONS

| | | | |
|---|---|---|---|
| 1,111,240 | 4/1968 | United Kingdom | 317/13 B |

*Primary Examiner*—J D Miller
*Assistant Examiner*—Patrick R. Salce
*Attorney, Agent, or Firm*—Jack J. Earl

[57] ABSTRACT

There is shown and described herein a D.C. motor control circuit which provides both overheat protection and current overload protection. The circuit provides for continued motor operation in short-duty cycles while operating in a current overloaded condition so long as the temperature of the motor has not exceeded a predetermined level past which damage might be expected.

1 Claim, 3 Drawing Figures

THERMAL PROTECTION FOR D.C. MOTORS

BACKGROUND OF THE INVENTION

In recent years, the application of permanent magnet DC motors as prime movers for machine tool feed drives have almost completely replaced the hydraulic motor. As experience was gained with the DC motor for this application, it was discovered that the method used for overload protection was ultraconservative. For certain duty cycles, the overload protection would shut the drive motor off, even though the motor temperature was hardly above the ambient temperature.

The reason for this is due to the difference in the dynamic thermal characteristics between the motor and the overload relay or heater. The motor has a much high thermal inertia than the heater. Therefore, the temperature rise time (thermal time constant) of the motor is much longer than that of the heater. As a result, when a current is applied to the motor and heater in excess of their continuous ratings, the heater temperature will rise rapidly in comparison to the motor, causing the motor circuit to open prematurely; long before the motor begins to get hot.

SUMMARY OF THE INVENTION

An overload device having an element responding to the current in a permanent magnet DC motor is combined with a motor temperature sensor. The overload device and temperature sensor when simultaneously operated condition other control circuit elements which in turn operate a power relay to disconnect the source of electrical energy from the motor.

THE DRAWINGS

DETAILED DESCRIPTION

Figure 1:
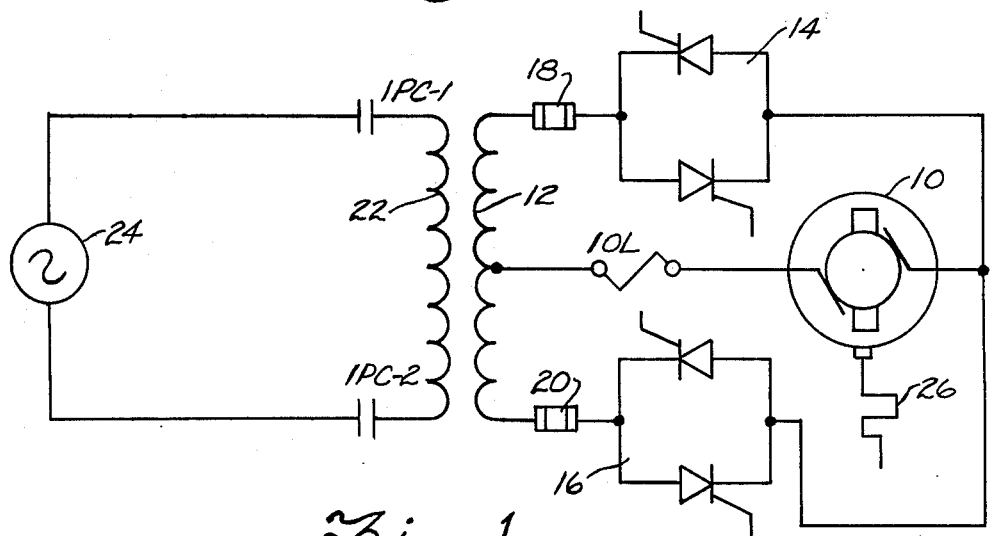
FIG. 1 is a schematic wiring diagram of a DC motor control circuit and its operating elements.

The direct current motor 10 in FIG. 1 is energized by electrical energy from the secondary 12 of a transformer. The alternating current energy in the secondary winding 12 is rectified by the two controlled rectifier circuits 14, 16. The electrical circuit through the motor 10 is completed through an overload relay 10L to the common point on the secondary winding 12. The relay 10L is of a conventional type which operates to open contacts 10L-1 (FIG. 2) in a control circuit. The overload relay 10L is a heating type, the temperature of which is dependent upon the current passing therethrough. The energizing circuit also includes conventional fuses 18,20, the function of these being primarily to protect the rectifier circuits 14,16 from excessive current, but secondarily these also protect the motor 10 from catastrophic energy levels.

The motor 10, in an application in which this invention is intended to provide protection, is in a repetitive short duty cycle such as a drilling machine spindle. Such an application demands high energy for a short time with rest periods between duty cycles. Any other similar application might be equally well served by this invention and to simplify this disclosure, the specific mechanism driven by the motor 10 has not been shown since it is not included as an element in the basic invention herein.

Figure 2:
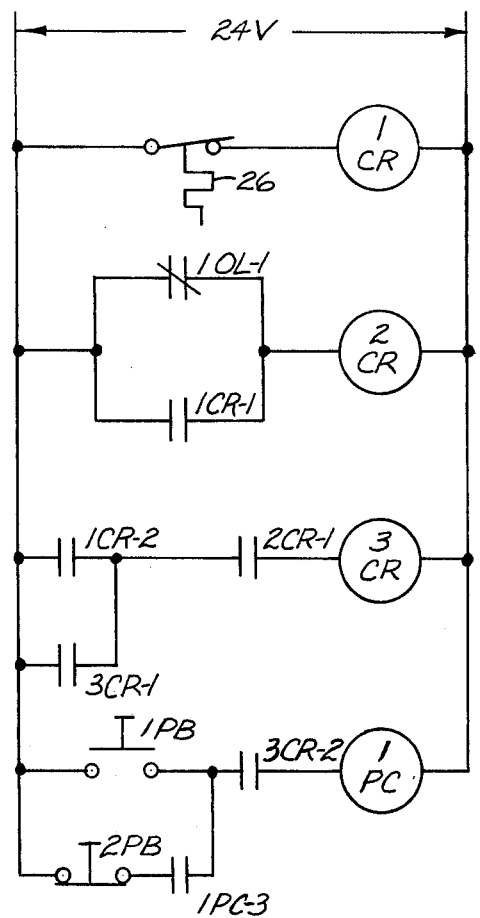
FIG. 2 is a ladder diagram control circuit for elements of the diagram of FIG. 1.

The energy input to the system is applied through a transformer primary winding 22 that is connectable across a source 24 of alternating current electrical energy. The primary winding 22 is energized from the source 24 when normally open relay contacts 1PC-1 and 1PC-2 are closed by operation of a control circuit such as shown in FIG. 2.

One other important element is shown representatively in FIG. 1. This is the snap action thermostat 26 which is applied to the casing of the motor 10 to sense the temperature of this inclosure structure of the motor 10. The temperature of the motor casing lags the temperature of the armature of the motor 10 but nonetheless is proportional to the temperature of the armature at any time over which heating occurs. The thermostat 26 might be for example, the type obtained from Texas Instrument Corporation and sold with the trademark "Klixon." One type used in a drilling machine application and found satisfactory was a No. 20700L/L135-1.5 Klixon snap action thermostat. This thermostat opened contacts when heated to 135° F, ± 5° and closed when returned to 120° F, ± 6°.

The control circuit of FIG. 2 includes a control relay 1CR that is energized whenever the snap action thermostat 26 is below the temperature at which it snaps open, taking into account the relay hysterisis when once opened. When energized, the relay 1CR closes its contacts 1CR-1 and 1CR-2 in circuit with the relays 2CR and 3CR, repsectively. The relay 2CR is energized when either the contacts 1CR-1 or normally closed contacts 10L-1 of the overload relay 10L are unoperated. The relay 3CR is initially energized when both the contacts 1CR-2 and 2CR-1 are closed, this occurring when both relays 1CR and 2CR are energized. A latch comprising the contacts 3CR-1 holds relay 3CR energized even if the relay 1CR thereafter deenergizes to open the contacts 1CR-2. A power control relay 1PC is first energized when a master start switch 1PB is closed and the contacts 3CR-2 are closed by energization of relay 3CR. A latch is provided around the switch 1PB through a serial circuit including a normally closed stop switch 2PB and contacts 1PC-3 closed when relay 1PC is energized. The contacts 1PC-1 and 1PC-2 are closed when relay 1PC is energized and therefore the source 24 is connected across the winding 22 (FIG. 1).

From the preceding description it can be seen that the power control relay remains energized whenever the contacts 3CR-2 are closed and the switch 2PB is not operated. The relay 3CR in turn can only remain energized when relay 2CR is energized. The relay 2CR is energized when either of two conditions is fulfilled. First, the snap action theremostat 26 is not actuated to deenergize relay 1CR or second, the overload relay 10L has not reached its actuating temperature. Once deenergized, the relay 3CR can only be reenergized when both relays 1CR and 2CR are energized. To start the motor 10 and continue its operation by use of the circuit of FIG. 2, there is an "and" condition that must be met and this condition is dependent on the snap action thermostat 26 and the overload relay 10L.

Figure 3:
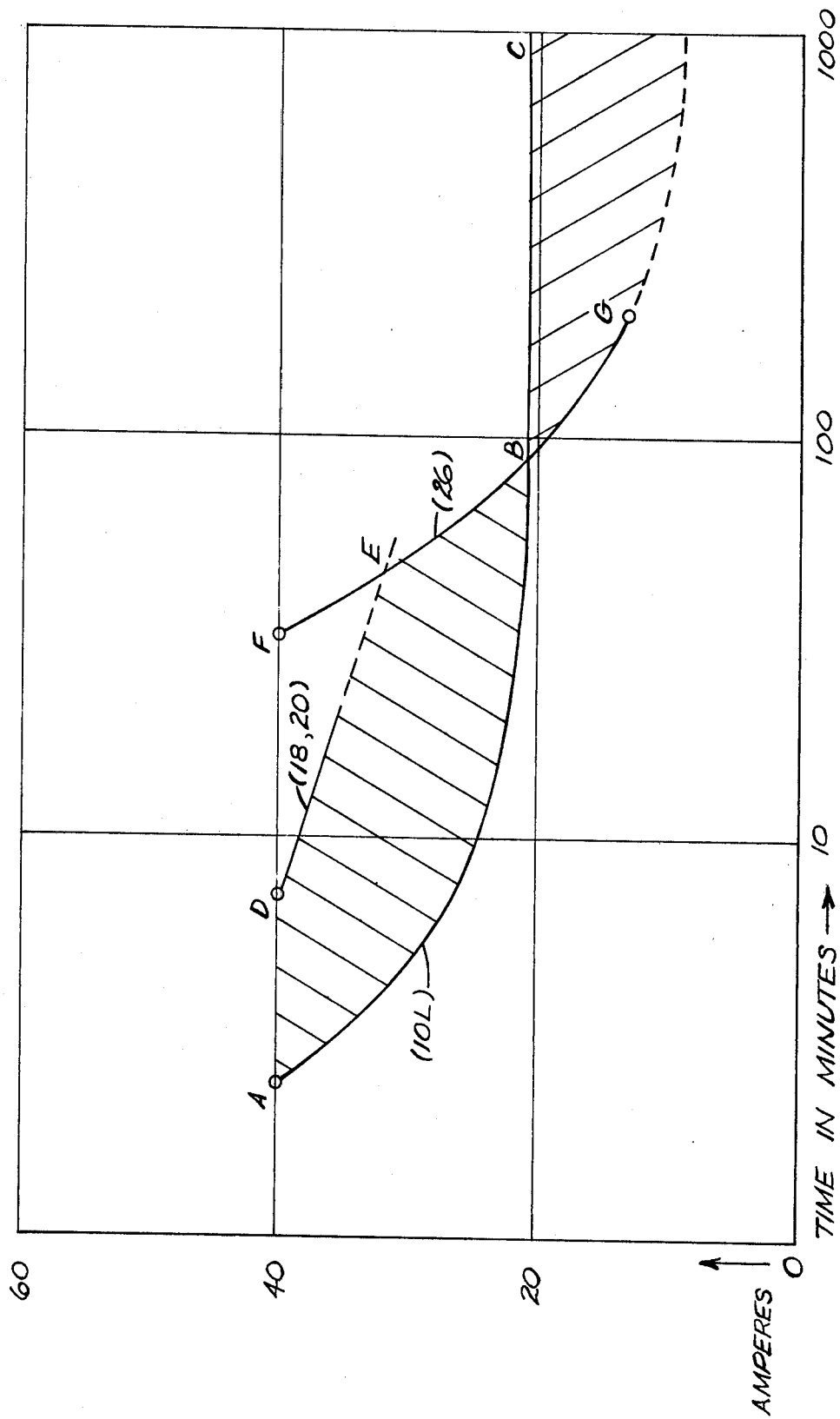
FIG. 3 is a plot of motor operation showing the results of control by the circuits of FIGS. 1 and 2.

The effect of the circuits described is shown graphically in FIG. 3. The diagram is that obtained for operation of a Getty 20 direct current motor obtained from Getty Manufacturing Company and with use of the snap action thermostat 26 described previously herein. The relay 10L is a type 816-COV16, with a N39 element, both obtained from the Allen-Bradley Company. The fuses 18,20 standard FRN30 fuses.

The curve ABC illustrates the operating conditions of the overload relay 10L on a time versus motor current plot. The curve DE represents the operation of the fuses 18,20. The curve FEBG represents the operation of the snap action thermostat 26 when applied to the closing of the motor 10 as described herein. By including in the control circuit the AND condition of the overload relay 10L and the thermostat 26, an area of increased system performance represented by the shaded area bounded by curves AB, BE and ED is obtained, it being presently conventional to supply only the circuit overload such as provided by relay 10L. The AND condition further does not sacrifice protection performance beyond the cross-over point B which might be made should the thermostat 26 be relied upon alone. The shaded area between curves BC and BG represents the area in which sacrifice of performance would be made in relying on the thermostat 26 alone. The fuses 18, 20 continue to provide protection against a catastrophic failure in the rectifiers 14,16 but this would ordinarily be at a power level substantially higher than usual operating levels as indicated by the curve DE.

This invention provides increased utility in short cycle operation by permitting the direct current motor 10 to operate in short cycles on a repetitive basis at instantaneous power ratings above what might be considered normal. Since protection against excessive heat is still provided, no harm to the motor occurs. In addition, conventional constant duty protection is also provided without sacrifice. The gain in motor utility is provided by taking advantage of the much higher thermal inertia of the motor 10 itself as compared to the overload relay heater 10L.

While the invention has been described in the context of the apparatus specifically disclosed herein, it is understood that variation in exact arrangement of circuits and control elements can be made within the scope of the claims following.

What is claimed is:

1. A control apparatus for a direct current motor including a casing and an armature, the casing being susceptible to heating from the armature, the motor having a substantial thermal inertia and adapted for use alternatively in intermittent and continuous duty cycles, the control apparatus comprising in combination:
    a. an overload heater operable in response to motor current and having a thermal inertia less than that of the motor;
    b. a temperature sensor mounted on and sensitive to the temperature of the casing for operation;
    c. a power relay operable one way and the other for connecting electrical energy to the motor;
    d. a control relay having contacts in circuit to control the condition of operation of the power relay;
    e. a circuit having a pair of parallel paths to the control relay for energization thereof;
    f. means in one of the parallel paths operated by the heater, and
    g. means in the other of the parallel paths operated by the sensor whereby electrical energy is disconnected from the motor in response to both said heater and said sensor at the same time.

* * * * *